(No Model.)
J. R. SMITH.
HORSE DETACHER.
No. 432,574. Patented July 22, 1890.
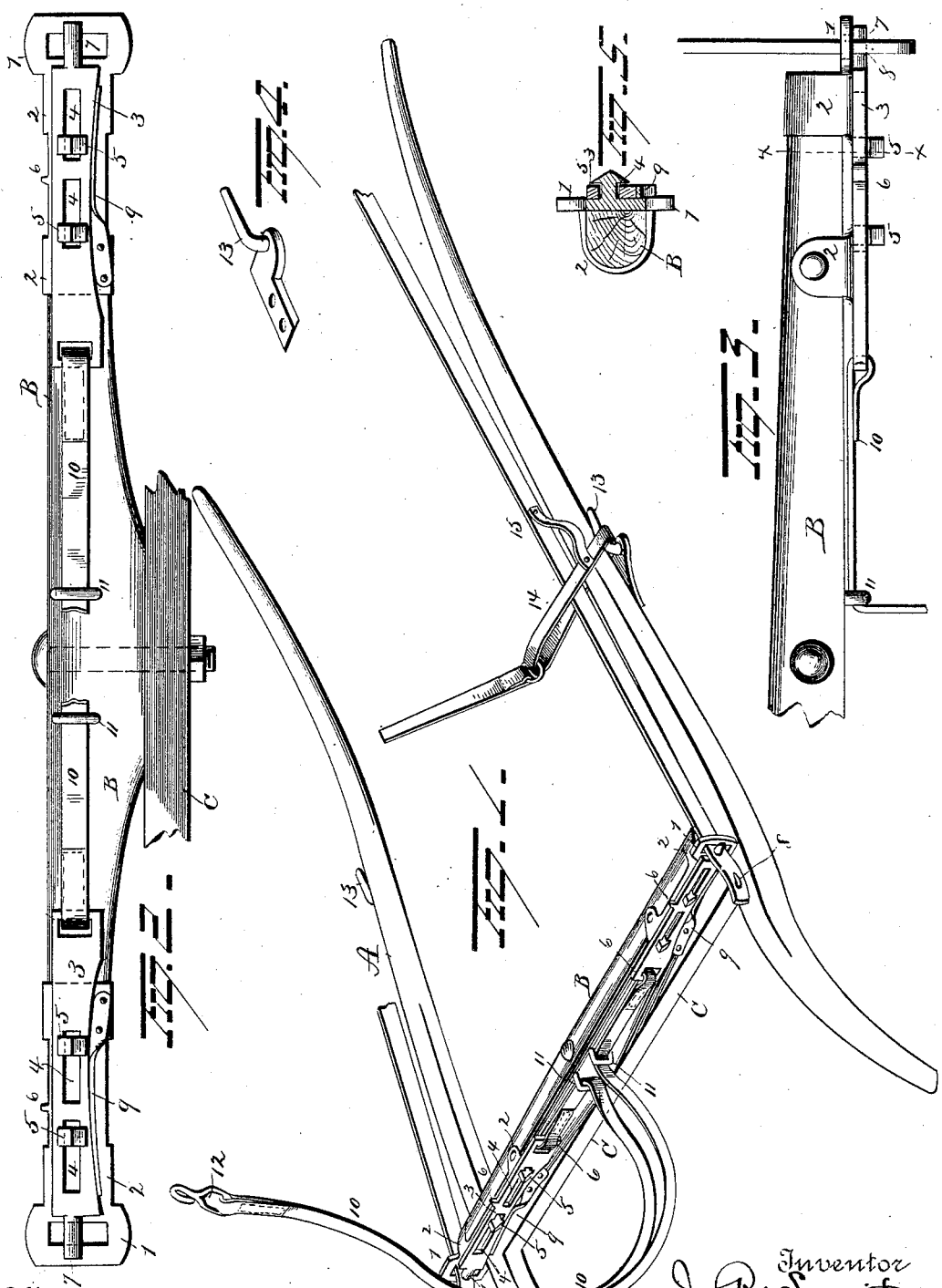
Witnesses
Inventor
J. R. Smith
By his Attorney

UNITED STATES PATENT OFFICE.

JAMES RAVENCRAFT SMITH, OF SHADY NOOK, KENTUCKY, ASSIGNOR OF ONE-THIRD TO DANIEL McSHANE, OF SAME PLACE.

HORSE-DETACHER.

SPECIFICATION forming part of Letters Patent No. 432,574, dated July 22, 1890.

Application filed March 10, 1890. Serial No. 343,328. (No model.)

*To all whom it may concern:*

Be it known that I, JAMES RAVENCRAFT SMITH, a resident of Shady Nook, in the county of Harrison and State of Kentucky, have invented certain new and useful Improvements in Horse-Detachers; and I do hereby declare the following to be a full, clear, and exact description of the invention, such as will enable others skilled in the art to which it appertains to make and use the same.

My invention relates to an improvement in horse-detaching devices, the object of the same being to provide means whereby the occupants of a vehicle can quickly detach the draft animal or animals in case of runaway or other accident.

A further object is to provide a simple mechanism for application to any vehicle and harness; and it consists in certain novel features of construction and combinations of parts, as will be hereinafter described, and pointed out in the claim.

In the accompanying drawings, Figure 1 is a perspective. Fig. 2 is a rear elevation. Fig. 3 is a plan view of one end of my improvement. Fig. 4 is a detached view of one of the holdback-hooks, and Fig. 5 is a view on line *x x* of Fig. 3.

A A represent the shafts or thills of a vehicle, and B is the singletree, pivoted in the usual manner to the cross bar or brace C of the shafts. On each end of the singletree a loop, staple, or equivalent device 1 is secured by rings, clips, or similar means 2 2. The tugs or traces are slipped through these loops and spring-actuated slides 3 3 have loose connection with the singletree. This connection is effected in the manner shown. Each slide has a pair of elongated slots 4 4, and pins 5 5, having heads thereon, are inserted through these slots and driven into the singletree to allow the slides to move endwise, and the heads retain them in place. The slides are preferably provided on their upper edges with a projection or lug 6 and on their outer ends with the pins 7, which are adapted to slide across the loops 1 1 and pass into the holes 8 8 formed for them in the tugs or traces.

The lower edges of the slides are curved outwardly and downwardly, and springs 9 9, secured on the singletree, bear on these curved portions to force the slides outward and retain them in this position, except when withdrawn by some counteracting influence. To do this a strap 10, split at one end, is passed through the eyelets 11 11 and secured to the inner ends of the slides. The opposite end is provided with a hook 12 or other device by which it is attached to the dash-board of the vehicle or in other convenient place within reach of the driver, where it may be easily pulled to withdraw the slides and their pins from the traces when it is desired to detach the draft-animal. The shafts are each provided with the outwardly and upwardly projecting hooks 13 13, and the holdback-straps 14 14 are looped over these hooks. A small strap 15 on each side connects the holdback with the trace, so that the latter are drawn off of the hooks immediately upon the horse being detached by virtue of their connection with the traces. In addition to this the holdbacks support the traces when released and keep them from the ground.

The device may also be used to unharness the horse from the vehicle, and the driver may thus detach the horse without leaving the carriage and then remove the harness. As arranged, the operation is simple, and the parts are not only few, but they are so arranged that all parts of the harness are practically released at once, and no part is left to get caught and broken or to trip up the horse or be trod upon and injured.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

In a horse-detacher, the combination, with a pole or shafts and whiffletrees connected therewith, of loops secured on the outer ends of the whiffletrees and adapted to receive the ends of the traces of a harness, slotted spring-actuated slides, pins for holding said slides to the whiffletrees, projections on the slides by which they may be operated, and a strap or equivalent device for removing the slides from the traces, substantially as set forth.

In testimony whereof I have signed this specification in the presence of two subscribing witnesses.

JAMES RAVENCRAFT SMITH.

Witnesses:
W. H. THROCKMORTON,
JOS. FENNELL.